United States Patent [19]

Sakanishi

[11] Patent Number: 5,163,217
[45] Date of Patent: Nov. 17, 1992

[54] DIE FOR MANUFACTURING LAMINATED CORE

[75] Inventor: Shinichi Sakanishi, Kiyose, Japan

[73] Assignee: Kuroda Precision Industries Ltd., Kawasaki, Japan

[21] Appl. No.: 690,687

[22] Filed: Apr. 24, 1991

[51] Int. Cl.$^5$ ............................................. H02K 15/02
[52] U.S. Cl. ................................. 29/564.6; 29/596; 29/609; 29/732; 29/738
[58] Field of Search ................ 29/596, 609, 738, 732, 29/736, 564.6, 564.1

[56] References Cited

U.S. PATENT DOCUMENTS

| | | | |
|---|---|---|---|
| 4,445,272 | 5/1984 | Bruhn et al. | 29/738 X |
| 4,619,023 | 10/1986 | Neuenschwander . | |
| 4,704,184 | 11/1987 | Oboshi . | |
| 4,738,020 | 4/1988 | Neuenschwander | 29/738 X |

FOREIGN PATENT DOCUMENTS

63-44178 2/1988 Japan .

*Primary Examiner*—Carl E. Hall
*Attorney, Agent, or Firm*—Keck, Mahin & Cate

[57] ABSTRACT

A die for manufacturing a laminated core for a rotor or a stator for an electric motor or a generator including rotary stacking and a skewing using a rotary die to stack the thin iron plates punched to a predetermined shape. Rotation of the crank shaft of the press is converted into a rotary stacking angle to take it out from the indexing device. Rotation of the crank shaft of the press is converted into a predetermined corresponding skew angle from the indexing device through a crank mechanism to take it out of the gear device. An amount of rotation having outputs from the indexing device and from the gear device combined with each other is taken out at the output shaft through a rotary friction transmitting mechanism and a rotation of this output shaft is applied to the rotary die.

6 Claims, 7 Drawing Sheets

DIE FOR MANUFACTURING LAMINATED CORE

BACKGROUND OF THE INVENTION

1. Field of the Invention

This invention relates to a die for manufacturing a laminated core constituting a rotor or a stator for an electric motor or a generator and more particularly a die for manufacturing a laminated core in which rotary stacking and skewing can be simultaneously carried out when thin core plates punched to a predetermined shape are stacked.

2. Description of the Prior Art

A rotor of an electric motor or a generator is constructed such that sheet-like thin plates, forming a laminate core are punched to a predetermined shape and several thin core plates are stacked together.

Figure 10:
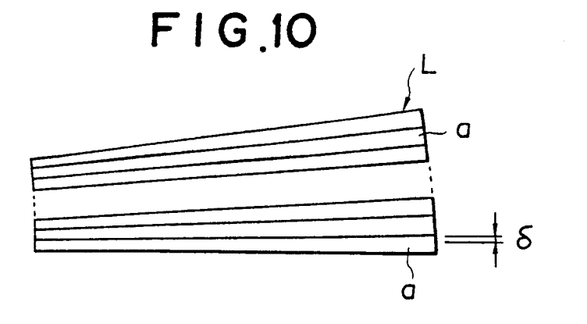
FIG. 10 is a schematic illustration showing a problem of the laminated cores in which thin core plates are stacked without any rotary stacking.

Although a wide, thin iron plate from which the sheet-like thin iron plates are cut and formed is made by rolling the wide, thin iron plate between rollers, thickness of the wide, thin iron plate is not uniform over the entire width of the plate due to the flexibility of the pressing rollers. Accordingly, when the thin core plates (a) punched from the sheet-like thin iron plate are piled up to constitute a laminated core L, as shown in FIG. 10, a height of the laminated core L in its circumferential direction is not uniform but shows a deformation under the influence of a difference delta in plate thicknesses.

Figure 11:
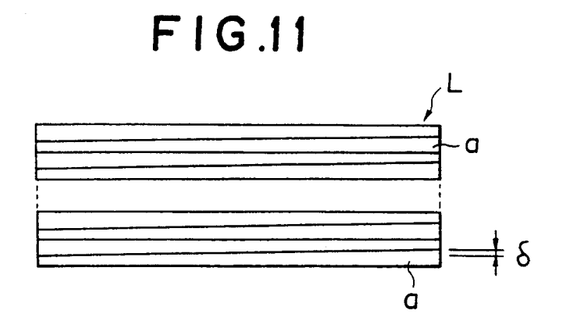
FIG. 11 is a schematic illustration showing laminated cores manufactured by a rotary stacking of the thin iron plates.

In order to eliminate the influence of the difference of the plate thicknesses, as shown in FIG. 11 in the prior art, the thin core plates (a) are rotated in sequence by 90° or 180° and stacked in a rotary stacking process.

Figure 3:
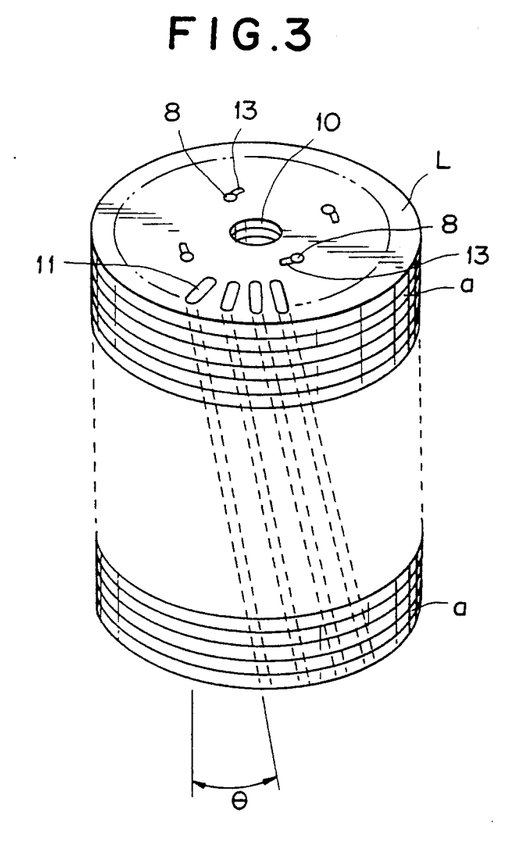
FIG. 3 is a perspective view showing an example of the manufactured laminated cores.

In order to improve an electrical characteristic of the laminated core, the thin plates constituting the laminated core L are displaced by a minute angle and stacked together as a whole, as shown in FIG. 3, and slots 11 are formed in a slant manner. This skewing is further carried out simultaneously with the rotary stacking process.

As described above, a die for manufacturing a laminated core capable of simultaneously performing rotary stacking and skewing as well as punching the iron, thin core plates, are shown in prior art patents such as U.S. Pat. Nos. 4,619,028; 4,738,020; and 4,704,184 (corresponding to Jap.Pat.Laid-Open No.Sho 60-170,534) or the like. As to a Japanese patent, the device disclosed in Jap.U.M.Publn.No.Sho 63-44178 is already known.

In case of the die devices disclosed in U.S. Pat. Nos. 4,619,028 and 4,738,020, a rotational force of the servo-motor is applied to the rotary die arranged in a lower die punching and stacking station, and this die is rotated by an angle required for performing the rotary stacking and skewing operations. However, such a system as described above has a problem that sufficient accuracy in an indexing angle with the servo motor may not be attained and a laminated core of high performance may not be provided. Under a condition in which the thin iron plates are punched and stacked at under a high speed, there is a problem that a following characteristic in operation of the servo mechanism may not be sufficiently attained and thus efficient manufacturing of the laminated cores may not be achieved. In addition, if the outer shape of the laminated cores to be manufactured is large, there may be a problem of availability of a suitable servo motor.

In the die disclosed in U.S. Pat. No. 4,704,184, it is disclosed that the rotary die is applied with a rotation of a desired angle required for performing rotary stacking as well as a skewing operation under a combination of a transmission device composed of gears and an indexing device. This die has a problem that the die is large in size as the transmission device includes a combination of gears and at the same time replacement of the gears of the transmission device is required when the rotational angle is to be varied and further it has an another problem that it takes much time to prepare for operation. In addition, in case of the combination of the gears, since a transmission ratio may not be adjusted in a stepless manner, it sometimes happens that the required rotational angle may not be attained.

SUMMARY OF THE INVENTION

This invention is provided in order to resolve the aforesaid problems and has as its object to provide a die device for manufacturing a laminated core which is superior in high-speed operation, can perform an indexing of a required rotational angle with high accuracy and is further capable of making a small device.

In order to accomplish this object, the present invention provides a die for manufacturing laminated cores by punching thin iron core plates with a rotary die at a punching and stacking station, rotating the rotary die, rotating in sequence the thin iron core plates only by a predetermined rotary stacking angle to eliminate a difference in plate thicknesses and stacking the plates. The die comprises:

an indexing device composed of a roller gear cam rotated in cooperation with a crank shaft of a press and a roller gear engaged with the roller gear cam for converting rotation of the crank shaft into a predetermined rotary stacking angle and outputting it to the roller gear;

a plurality of small rollers rotatably arranged around a circumference on the roller gear;

an output shaft having a concentric output disk to which these small rollers are internally contacted; and thereby this output shaft is connected to the rotary die and the rotary die is applied with a predetermined rotary angle required for the rotary stacking operation.

With such an arrangement described above, since rotation of the roller gear capable of taking out an output from the indexing device is transmitted to the output disk through some small rollers, it is possible to apply a rotation of the desired rotary stacking angle to the rotary die to be connected to the output shaft.

The present invention may provide a configuration comprising an indexing device composed of a roller gear cam to be rotated in cooperation with the crank shaft of a press and a roller gear engaged with the roller gear cam for converting a rotation of the crank shaft into a predetermined rotary stacking angle and outputting it to the roller gear;

a plurality of small rollers rotatably arranged around a circumference on the roller gear;

an output shaft having concentrically an output disk to which these small rollers are internally contacted;

an input roller contacting outwardly with the small rollers and arranged concentrically and rotatably in relation to the roller gear;

a gear shaft fixed to the input roller, passing through a center of the roller gear, extending there and rotatably fitted to a case; and a gear device arranged between the roller gear cam and the gear shaft in order to apply a rotation of the roller gear cam to the input roller as a rotation of a predetermined skewing angle, wherein the output shaft is connected to the rotary die and the rotary die is applied with a predetermined rotary angle having a rotary stacking angle from the indexing device with the roller gear mechanism combined with a corresponding skew angle from the input roller through a gear device from the roller gear.

With such an arrangement described above, the rotary stacking rotation to be outputted to the roller gear of the indexing device is transmitted to the output disk through small rollers, the skew corresponding angular rotation outputted from the gear device is transmitted to the output disk through the input roller and the small rollers, so that a rotation having a rotary stacking angle and a corresponding skew angle combined with each other can be taken out at the output shaft and then a rotation of the predetermined rotary angle and a corresponding skew angle can be applied to the output shaft.

The present invention provides the aforesaid gear device which is comprised of a worm wheel concentrically fixed to the gear shaft of the roller gear, a worm engaged with the worm wheel and a crank mechanism for transmitting a rotation of the roller gear cam to the worm.

According to this configuration, an eccentric amount adjusting mechanism is provided in the crank mechanism, the eccentric amount adjusting mechanism is adjusted to enable a corresponding skew angle to be applied to the rotary die to be adjusted in a stepless manner.

A die of the present invention is constructed such that the worm is provided a one-way clutch.

According to the arrangement described above, since the worm is rotatedonly in one direction, it is possible to apply the corresponding skew angle to the rotary die without any erroneous operation.

DESCRIPTION OF THE PREFERRED EMBODIMENT

Figure 1:
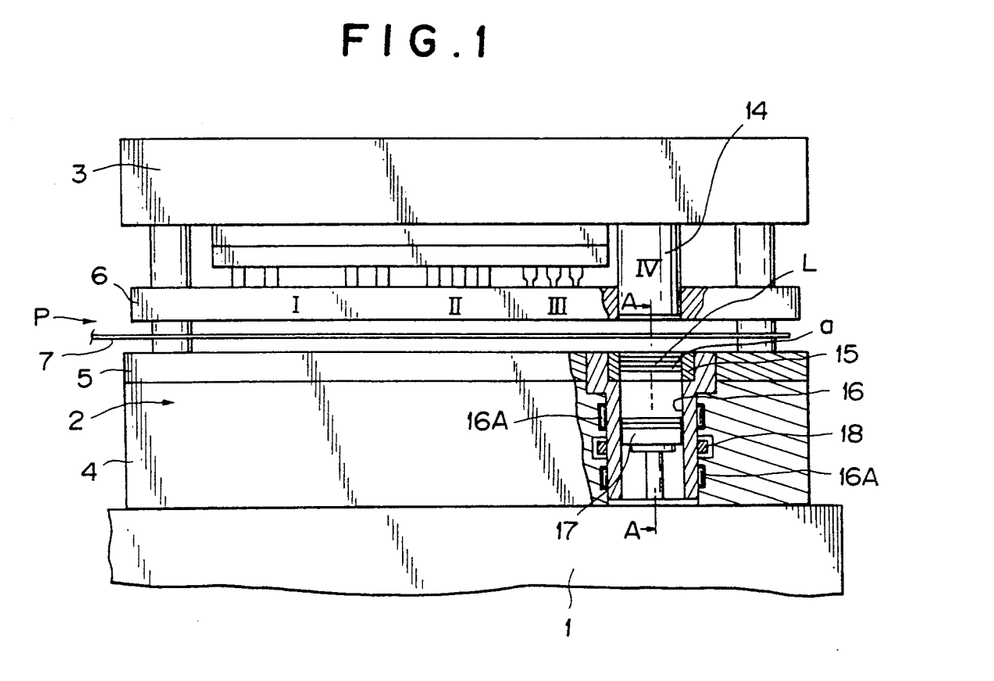
FIG. 1 is a schematic elevational view of a press part of a die for manufacturing a laminated core of the present invention.

Referring now to the drawings, a practical preferred embodiment of the die for manufacturing a laminated core of the present invention will be described in detail. FIG. 1 shows an entire configuration of one preferred embodiment of a die for manufacturing the laminated core.

Figure 2:
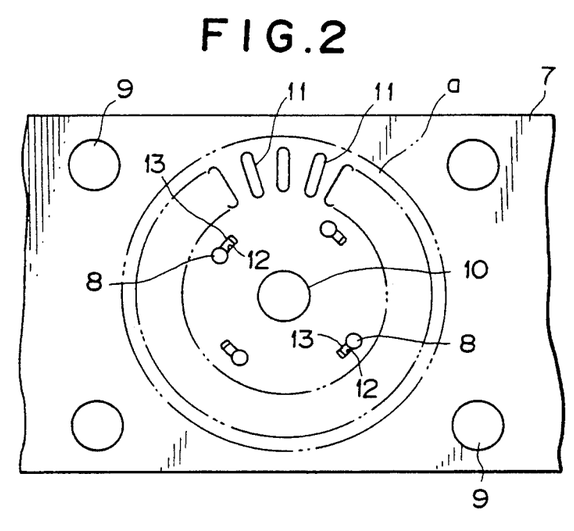
FIG. 2 is a top plan view showing a sheet-like thin iron plate to be sent to a punching and stacking station.

FIG. 1 shows a lower die 2 and an upper die 3 mounted on a machine table 1 acting as a base block. A belt-like thin plate 7 for making as a laminated core is supplied from a direction indicated by an arrow P between the die plate 5 on the die holder 4 of the lower die 2 and the stripper plate 6, and at the first station I, the belt-like thin iron plate 7 is punched with skew releasing holes 8 and pilot holes 9 (see FIG. 2). Subsequently, at the second station II, an axial hole 10 and slots 11 are punched in the belt-like thin iron plate 7, and at the third station III, fitting cut-and-rise projection holes 12 communicating with the releasing holes 8 and the cut-and-rise projections 13 are formed. FIG. 2 shows the belt-like thin iron plate 7 to be sent to the subsequent fourth station IV.

Subsequently, at the fourth station IV, a punching and stacking station, an outer die punching of the thin iron plates (a) becoming an iron core composing piece, rotary stacking, skewing and press fitting are carried out by a punch 14 and a rotary die 15. In this case, in order to make an integral coupling of thin iron core plates (a) punched into the rotary die 15 with a press fitting, the cut-and-rise projections 13 of a subsequent thin iron core plate (a) are fitted to the cut-and-rise projection holes 12 of a preceding iron core plate (a). The coupled thin iron core plates (a) are stacked on a receptacle table 17 ascending or descending within a cylindrical squeezing ring 16, the desired number of thin iron core thin plates (a) are stacked, resulting in forming a laminated core L. As a result, the receptacle table 17 is lowered hydraulically and the laminated core L is taken out of the device. FIG. 3 shows a laminated core L formed by a method wherein the thin iron plates (a) are rotated by a predetermined rotary stacking angle and a corresponding skew angle theta and stacked.

A configuration of the mechanism for performing rotary stacking and skewing of the thin iron plates (a) in the rotary die 15 will be described as follows.

Figure 4:
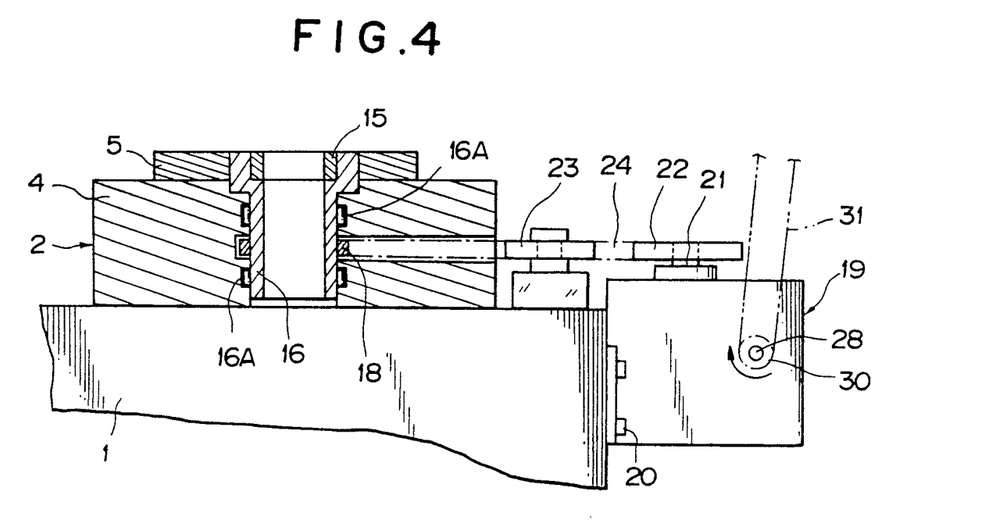
FIG. 4 is a sectional view taken along line A—A of FIG. 1.
Figure 5:
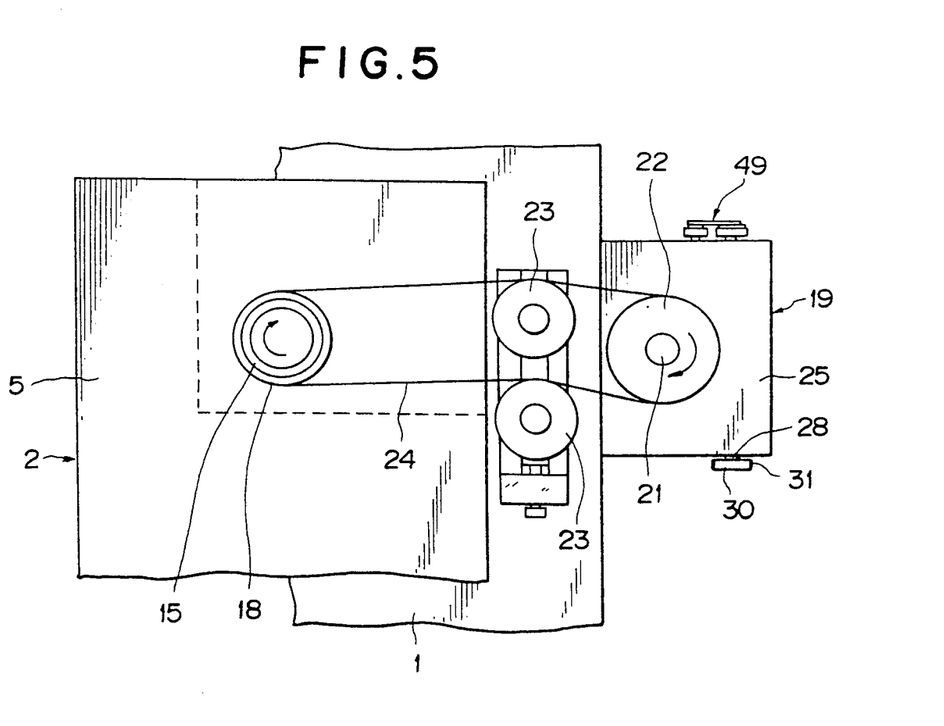
FIG. 5 is a top plan view of FIG. 4.

As shown in the sectional view for indicating the rotary die part of FIG. 4, the squeezing ring 16 having the die 15 fitted at the upper part thereof is rotatable by bearings 16A with respect to the die holder 4 of the lower die 2, and a pulley 18 is fitted to an outer periphery of the squeezing ring 16. To a side wall of the table 1 is fastened a rotation applying device 19 with fixing screws 20. As shown in FIG. 5, a timing belt 24 is wound between a pulley 22 fitted to an output shaft 21 of the rotation applying device 19 and a pulley 18 of the squeezing ring 16 through tension adjusting pulleys 23 fixed on the table 1. This rotation applying device 19 may receive a rotation of a clamp shaft (not shown) of the press, take a rotation of rotary stacking angle with the indexing device stored therein, take a rotation of a predetermined angle required for a skewing with the crank mechanism and the gear device, combine these rotations and apply them to the rotary die 15.

Figure 6:
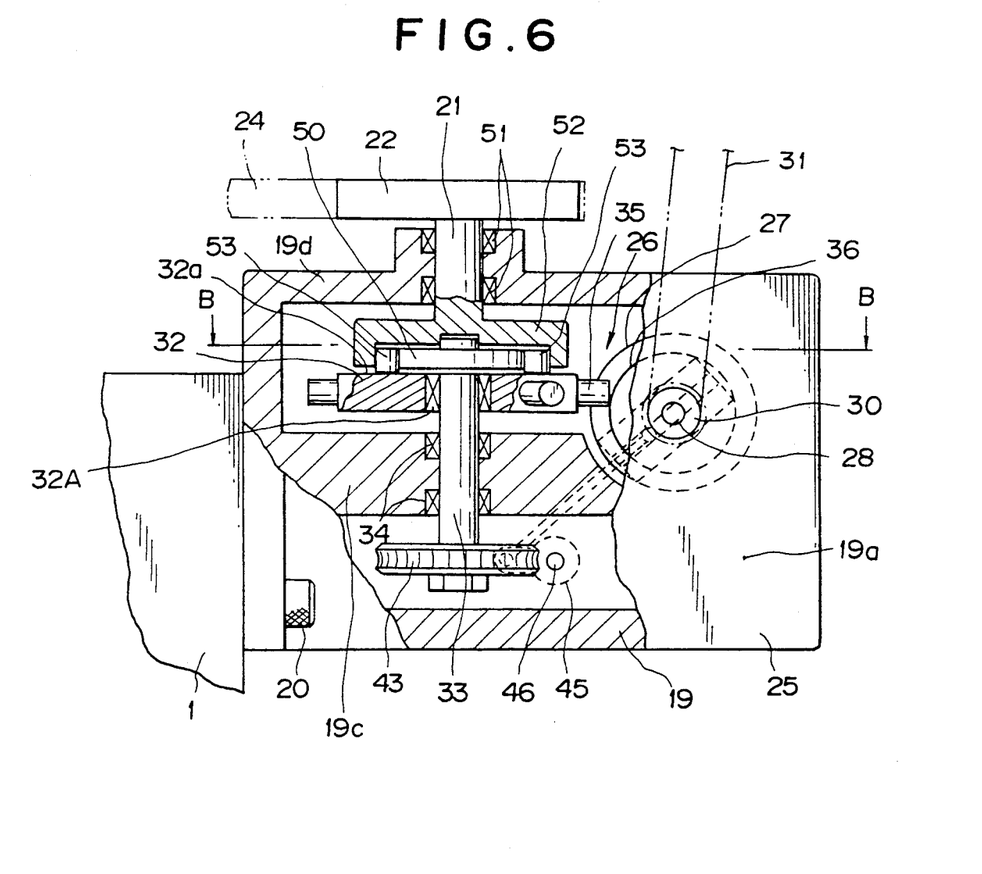
FIG. 6 is a longitudinal section showing a rotation applying device to be used in the die.
Figure 7:
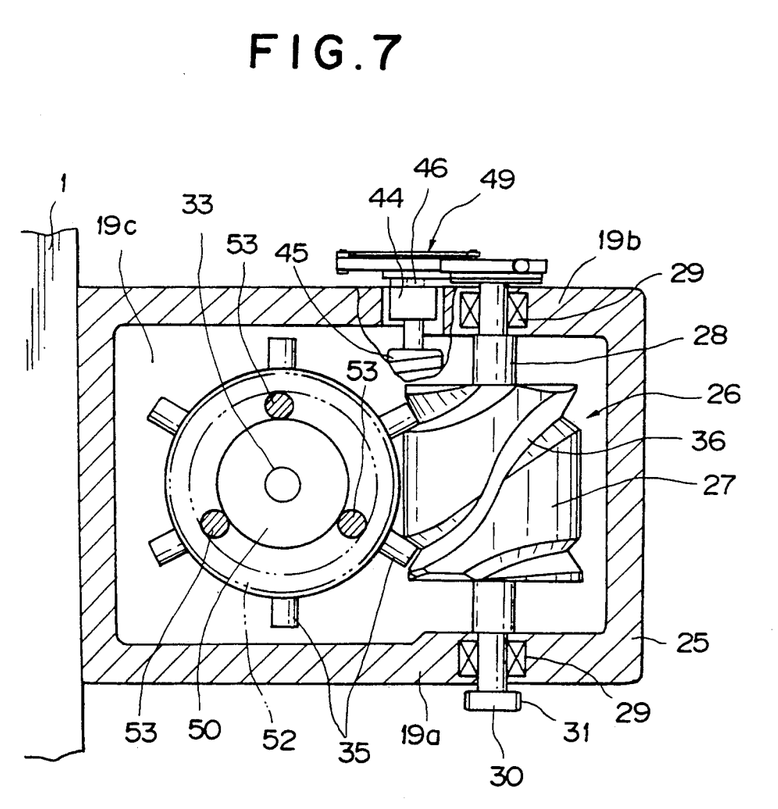
FIG. 7 is a sectional view taken along line B—B of FIG. 6.

As shown in FIGS. 6 and 7, a cam shaft 28 having a roller gear cam 27 constituting a part of the indexing device 26 is rotatably arranged within a case 25 of the rotation applying device 19 between the opposing side plates 19a and 19b with bearings 29. To the cam shaft 28 projecting out of the side plate 19a of the case 25 is installed the pulley 30 and rotation of the press crank shaft is transmitted to the roller gear cam 27 through a timing belt 31 wound around the pulley 30. To an intermediate wall 19c extended in a lateral direction within the case 25 is rotatably attached the gear shaft 33 with bearings 34. To the upper part of this gear shaft 33 is rotatably fitted the roller gear 32 with a bearing 32A. A cam follower 35 projecting from a circumferential surface of the roller gear 32 is engaged with a cam groove 36 of the roller gear cam 27.

Figure 8:
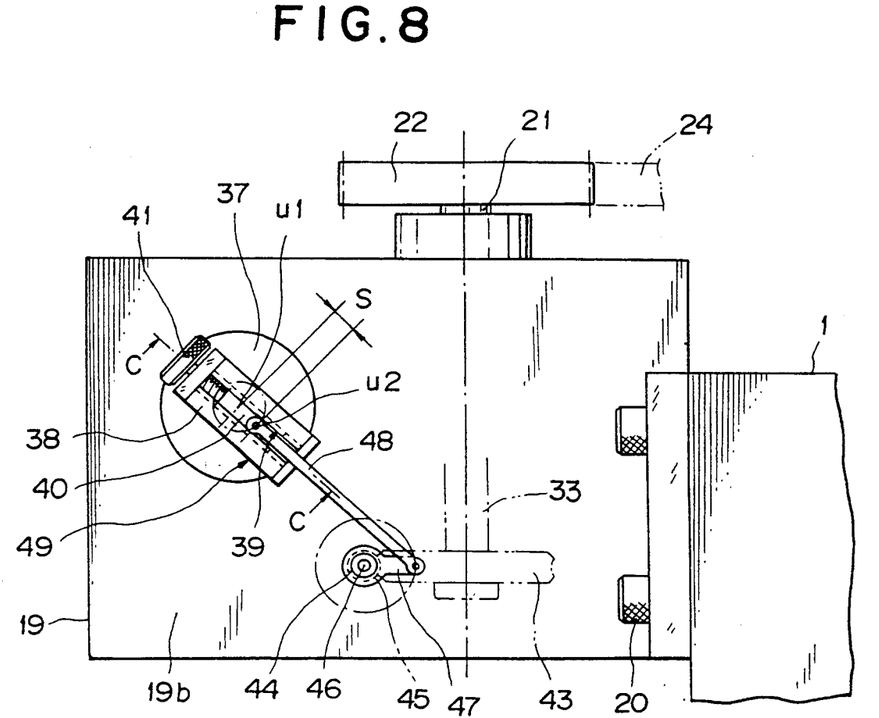
FIG. 8 is a side elevational view for showing the rotation applying device.
Figure 9:
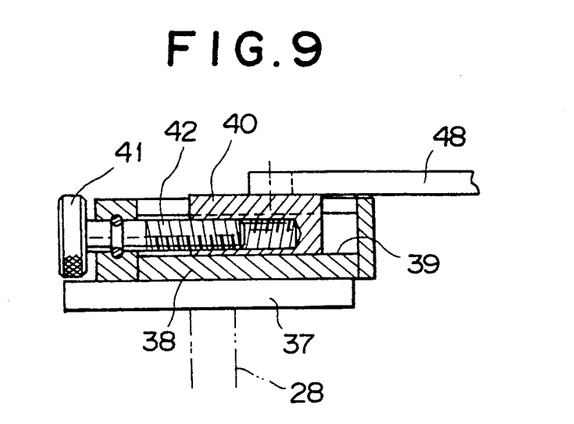
FIG. 9 is a sectional view taken along a line C—C of FIG. 8.

To the cam shaft 28 projecting out of the opposing side plate 19b is attached a disk 37 as shown in FIG. 8. A crank plate 38 is fixed on the disk 37. As shown in FIG. 9, a block 40 is slideably assembled within a groove 39 longitudinally formed in the crank plate 38. An outer thread 42 of an adjusting knob 41, rotatably attached to an end surface of the crank plate 38, is threadedly engaged with this block 40. Rotation of this adjusting knob 41 enables a position of the block 40 to be moved in a longitudinal direction of the groove 39. In this way, the adjusting knob 41, block 40 and groove 39 constitute an eccentric amount adjusting mechanism.

On the lower end of the gear shaft 33, projecting toward the lower surface of the intermediate wall 19c, a worm wheel 43 is rotatably supported. A worm 45, arranged between the side walls 19a and 19b of the case 25 through a one-way clutch 44, is engaged with the worm wheel 43. An arm 47 is attached to a worm shaft 46 projecting out of the side plate 19b, and an extreme end of the arm 47 and the block 40 at the crank plate 38 are connected by a lever 48. A rotation with a radius (an eccentric amount)s between a center (u1) of the cam shaft 28 and a fixing position (u2) of the lever 48 to the block 40 is converted into a minute rotation through a worm 45 in a synchronized form with the rotation of the crank shaft of the press by a crank mechanism 49 composed of the components described above and then this rotation is transmitted to the worm wheel 43. This amount of rotation is used as a skew rotation angle when the thin iron plates (a) are stacked. This skew rotation angle can be adjusted in a stepless manner by rotating the adjusting knob 41 and varying a position of the block 40.

An input roller 50 is concentrically fitted to a gear shaft 33 projecting out of the upper surface of the roller gear 32. An output disk 52 is provided at a lower end of an output shaft 21 rotatable with bearings 51 to an upper plate 19d so as to enclose the input roller 50. Three small rollers 53 spaced apart by 120° are rotatably arranged between an inner periphery of the output disk 52 and the input roller 50 on the roller gear surface 32a so that they are frictionally contacted with the input roller 50 and frictionally contacted with the output disk 52. A rotation shown on the gear shaft 33 through this operation is transmitted to an output shaft 21 of the rotation applying device through the input roller 50, small rollers 53 and the output disk 52. In this case, the input roller 50, small rollers 53 and output disk 52 may constitute a rotary transmitting mechanism constituting a roller deceleration means. In addition, a ring composed of a resilient member may be placed between the small rollers 53 and the output disk 52.

With such an arrangement, as the roller gear cam 27 is rotated synchronously with the operation of the press crank shaft driving the upper die of the press, the roller gear 32 is rotated, and the rotation of the roller gear 32 is transmitted to the output disk 52 as a rotation of the rotary piling-up through small rollers 53.

A rotation of the cam shaft 28 is transmitted as one-way repetitive displacement to the worm wheel 43 through the cam plate 38, lever 48, arm 47, clutch 44 and worm 45. One-way repetitive displacement of the worm 45 is transmitted to the output disk 52 as a skew rotation through input roller 50 and small rollers 53.

With such an arrangement, combined rotation of a rotary stacking and skewing is taken out at an output shaft 21 integral with the output disk 52 and this rotation is applied to the rotary die 15 through the timing belt 24.

Accordingly, the thin iron plates (a) punched within the rotary die 15 are rotated by an angle required for rotary stacking and skewing for every plate and thereafter they are press fitted and stacked to form a laminated core L.

If the adjusting knob 41 is rotated to cause a fixing position (u2) of the lever 48 to the block 40 to be coincident with the center (u1) of the cam shaft 28, a rotation for the skewing does not appear at the worm wheel 43, resulting in stacking of the thin iron plates (a) without applying any skewing angle.

In the aforesaid preferred embodiment, the skewing angle applying means is constituted by a crank mechanism 49, and a gear device composed of a worm 45 and a worm wheel 43 so as to apply a corresponding skew angle to the input roller 50. However, it may also be applicable that the corresponding skew angle is applied to the input roller 50 by a servo motor synchronously with a rotation of the crank shaft of the press.

As described above, according to the present invention, since the rotation outputted from an indexing device getting a rotary stacking angle or the gear device getting a corresponding skew angle can be transmitted to the rotary die through a rotary friction transmitting mechanism, there is no looseness or back lash due to looseness as compared with the prior art technique using a gear mechanism. A stable smooth rotation can be assured and a desired rotational angle of high accuracy can be applied to the rotary die. Even if the device is operated under a high speed, noise or vibration is remarkably reduced. In addition, a small-sized device can be obtained.

As compared with the case in which a desired rotational angle is formed by a servo motor, a superior operation following feature can be attained under a high speed.

An adjustment of the corresponding skew angle can be carried out by an eccentric amount adjusting mechanism mounted in the crank mechanism and as compared with the case in which the angle adjustment is carried out by varying a transmission ratio of the gear mechanism, an adjustment of the corresponding skew angle can be performed in a stepless manner and widely.

The present invention might be modified and improved into many forms and is restricted only with the claims.

What is claimed is:

1. A die for manufacturing a laminated core by punching thin iron plates with a rotary die at a punching and stacking station, rotating said rotary die, rotating the thin iron plates in sequence only by a predetermined rotary stacking angle to eliminate a difference in plate thicknesses and stacking the plates, said die comprising:

an indexing mechanism comprising a roller gear cam rotated in cooperation with a crank shaft of a press and a roller gear engaging with the roller gear cam for converting a rotation of the crank shaft into a predetermined rotary stacking angle and outputting it to the roller gear;

a plurality of small rollers rotatably arranged around a periphery on the surface of said roller gear;

an output shaft comprising a concentric output disk to which said small rollers are contacted; wherein said output shaft is connected to said rotary die and a predetermined rotational angle required for a rotary stacking operation is set on the rotary die.

2. A die for manufacturing a laminated core by punching thin iron plates with a rotary die at a punching and stacking station, rotating said rotary die, rotating the thin iron plates in sequence only by a predetermined rotary stacking angle for eliminating a difference in plate thicknesses and a predetermined corresponding skew angle for improving an electrical characteristic, said die comprising:

an indexing mechanism comprising a roller gear cam rotated in cooperation with a crank shaft of a press and a roller gear engaging with the roller gear cam for converting a rotation of the crank shaft into a predetermined rotary stacking angle and outputting it to the roller gear;

a plurality of small rollers rotatably arranged around a periphery on the surface of said roller gear;

an output shaft comprising a concentric output disk to which said small rollers are internally contacted;

a gear shaft fixed on said input roller, passing and extending through a center of the roller gear and rotatably attached to a case; and a gear device arranged between the roller gear cam and the gear shaft for applying a rotation of said roller gear cam to the input roller as a rotation of a predetermined corresponding skew angle, said output shaft being connected to said rotary die, and a predetermined rotational angle combining a rotational angle for a rotary stacking from the indexing mechanism by the roller gear through the gear device is set on the rotary die.

3. A die for manufacturing a laminated core according to claim 2 wherein said skew angle applying means comprises a gear device arranged concentrically around said gear shaft, operated by receiving a rotation of said roller gear cam and outputting a rotation of a predetermined corresponding skew angle to said gear shaft.

4. A die for manufacturing a laminated core according to claim 3 wherein said gear device comprises a worm wheel concentrically fixed to said gear shaft, a worm engaging said worm wheel and a crank mechanism for transmitting a rotation of said roller gear cam to said worm.

5. A die for manufacturing a laminated core according to claim 4 wherein said crank mechanism is provided with an eccentric amount adjusting mechanism.

6. A die for manufacturing a laminated core according to claim 4 wherein said worm is provided with a one-way clutch.

* * * * *